United States Patent [19]

Klein

[11] 4,102,374

[45] Jul. 25, 1978

[54] JIG AND TEMPLATE APPARATUS AND METHOD FOR PREPARING A CORNER INSERT FOR A LAMINATED PLASTIC COUNTERTOP

[76] Inventor: Fred Godfrey Klein, 2861 Cherry Blossom La., Salt Lake City, Utah 84117

[21] Appl. No.: 664,713

[22] Filed: Mar. 8, 1976

[51] Int. Cl.[2] ........................... B23Q 3/06; B27C 5/06

[52] U.S. Cl. .............................. 144/314 B; 33/174 G; 33/185 R; 29/559; 90/13.1; 90/62 R; 83/461; 269/25; 269/55; 269/289 R; 144/144 R; 144/144 A; 144/144.5 R; 144/288 C

[58] Field of Search .................... 29/559; 83/451, 460, 83/461; 90/62 R, 12 R, 12.0, 13.1; 269/25, 27, 71, 55, 156, 289; 33/180 R, 185 R, 174 G, 174 H; 144/134 R, 134 A, 137, 144 R, 144 A, 144.5

[56] References Cited

U.S. PATENT DOCUMENTS

| | | | |
|---|---|---|---|
| 931,552 | 8/1909 | Ahlers | 144/144.5 |
| 1,818,837 | 8/1931 | Barker | 144/288 R |
| 2,188,433 | 1/1940 | Friese | 269/71 |
| 2,517,431 | 8/1950 | Hildebrand et al. | 269/25 X |
| 2,568,905 | 9/1951 | Wiehsner | 269/25 X |
| 2,669,958 | 2/1954 | Sweeney | 269/71 X |
| 3,519,043 | 7/1970 | Guill | 144/144.5 |
| 3,751,816 | 8/1973 | Hayes | 33/185 R |

*Primary Examiner*—Gil Weidenfeld
*Assistant Examiner*—W. D. Bray
*Attorney, Agent, or Firm*—H. Ross Workman; J. Winslow Young

[57] ABSTRACT

An apparatus and method for preparing an inside diagonal corner insert to a laminated plastic countertop surface. The diagonal corner insert transects the inside corner of the countertop and permits the countertop to accommodate a rotatable shelf apparatus thereunder. Dimensionally corresponding female and male templates are provided so that a cutting tool guided by the templates will produce a corresponding male insert for the void created in the countertop with the female template. The countertop and template are advantageously secured in an easily accessible position by a jig apparatus which utilizes pneumatic pistons for securing both the workpiece and the templates.

23 Claims, 12 Drawing Figures

JIG AND TEMPLATE APPARATUS AND METHOD FOR PREPARING A CORNER INSERT FOR A LAMINATED PLASTIC COUNTERTOP

BACKGROUND

1. Field of the Invention

The present invention relates to a jig apparatus and templates of the type adapted to guide a routing tool to prepare a diagonal corner insert for a countertop.

2. The Prior Art

Countertops, particularly those used in domestic kitchens, are prepared from a variety of surfaces such as tile and, more particularly, laminated plastic surfaces. Laminated plastic is commercially available from a variety of sources and in a variety of colors, patterns and textures. The countertop is prepared by obtaining sheets of laminated plastic which are cut to pattern and thereafter bonded to a suitable surface such as plywood or, more commonly, a pressed particle board. The countertop also generally includes a coved backsplash along the rear edge of the countertop and, customarily, a raised no-drip edge along the front edge of the countertop.

The no-drip edge includes a slight upraised ridge along the edge of the countertop and terminates in a downwardly depending lip extending below the bottom surface of the countertop. The raised ridge is called a nodrip edge because it prevents fluid spills from flowing off the edge of the countertop. This type of no-drip edge is referred to in the trade as a "bull nose" because of its bulbous appearance in cross section.

Laminated plastic countertops are generally prefabricated in a remote shop location and thereafter shipped to a point of installation in the domestic kitchen. The countertops are fabricated in a variety of shapes including straight, L-shaped, and U-shaped, or modifications of these various shapes. However, unless specific construction steps are taken, the underlying cabinet space in the corner covered by the countertop will be inaccessible since the two under-counter cabinets will adjoin at the inside corner preventing access to the space underlying the countertop corner. Accordingly, it is conventional practice to provide access with a narrow door which transects the corner and exposes a rotatable shelf arrangement commonly referred to as a Lazy Susan. An insert to the countertop advantageously (1) provides increased surface area to the countertop, (2) a more pleasing appearance, (3) extends the no-drip edge and (4) accommodates a wider access to an underlying rotatable shelf arrangement.

Customarily, the angled countertop is prepared by separately preparing two straight sections of countertop and thereafter joining the two sections in a miter. A segment is then cut from the inside corner of the joined countertop and replaced with a dimensionally corresponding insert which extends the surface of the countertop diagonally to transect the angle between the two sections. One of the triangular sections cut from an end of a straight section is used to fabricate the insert. To be accepted, the countertop incorporating the insert must be carefully prepared so that the surface presents a smooth profile with only very fine lines in the laminated plastic surface designating where the joinder has taken place. Historically, these corner inserts have been prepared by an individual craftsman expending several hours of meticulous labor carefully preparing the insert so that the countertop will be acceptable in a domestic kitchen environment.

In view of the foregoing, it would be a significant advancement in the art to provide an apparatus and method for preparing corner inserts for laminated plastic countertops accurately and with less expended time. The improvement should include a template apparatus which provides dimensionally corresponding female and male templates for preparing the corner to receive the insert and the insert for the corner. Apparatus should also be provided for securely engaging the templates on the countertop workpiece so as to provide a stable work platform for the same. Such an invention is disclosed herein.

BRIEF SUMMARY AND OBJECTS OF THE INVENTION

The present invention relates to a jig apparatus and templates which accommodate preparation and insertion of a diagonal corner insert for a laminated plastic countertop. The jig apparatus securely holds the countertop and the templates so that a cutting tool may be guided by the templates to produce a male insert and a corresponding female cutout. The jig apparatus securely supports and holds the countertop while work is being performed thereon. The jig accommodates a countertop even with an exceptionally high back splash.

It is, therefore, an object of this invention to provide improvements in the method of inserting transecting corner pieces for a laminated plastic countertop.

Another object of this invention is to provide improvements in the method for inserting transecting corner pieces for a laminated plastic countertop.

Another object of this invention is to provide improvements in apparatus for preparing corner inserts for laminated plastic countertops.

It is another object of this invention to provide an adjustable female template for guiding a cutting tool on a countertop surface to provide a female cutout.

An even still further object of this invention is to provide improvements in male templates for guiding a cutting tool on a portion of countertop surface to produce a male insert.

These and other objects and features of the present invention will become more fully apparent from the following description and appended claims taken in conjunction with the accompanying drawing.

DETAILED DESCRIPTION OF THE PREFERRED EMBODIMENTS

Figure 1:
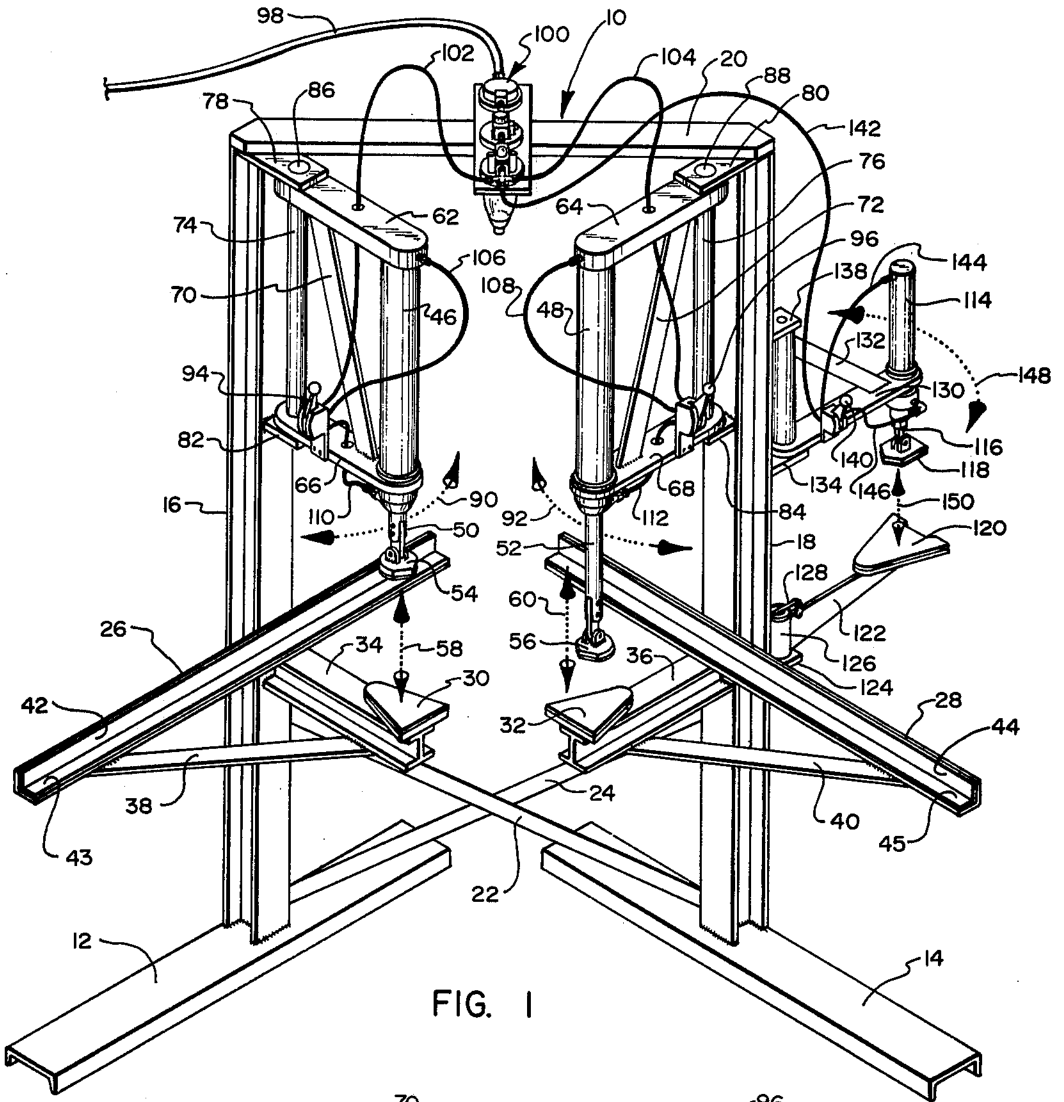
FIG. 1 is a perspective illustration of a preferred embodiment of the jig apparatus of this invention.

The invention is best understood by reference to the drawing wherein like parts are designated with like numerals throughout.

THE JIG APPARATUS

Figure 2:
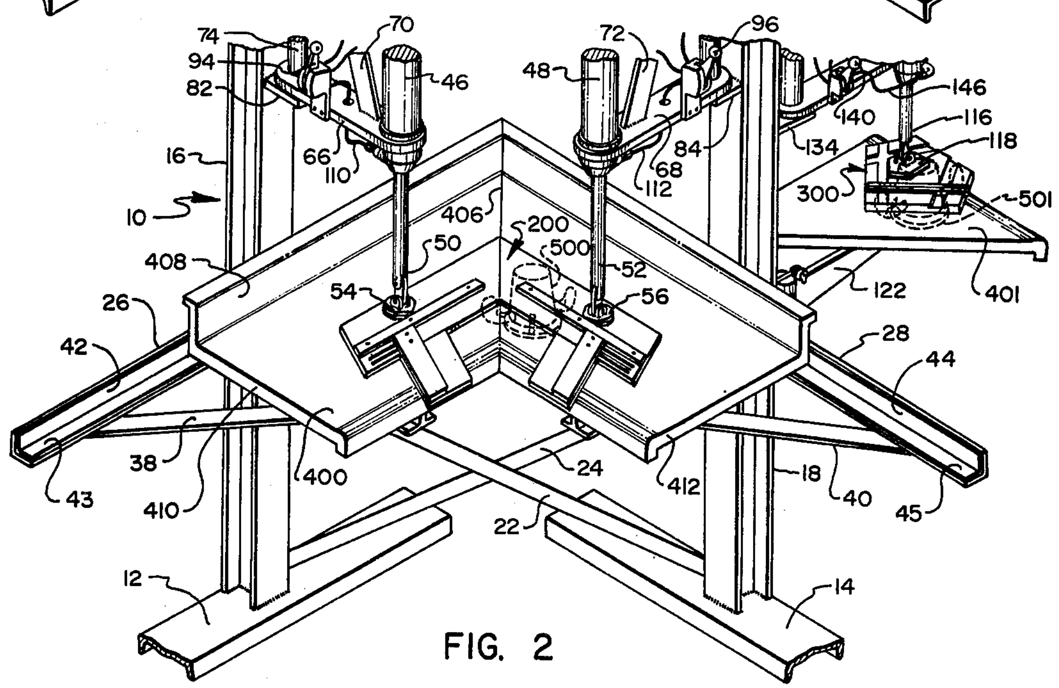
FIG. 2 is a fragmentary illustration of the jig apparatus of FIG. 1 with workpieces and templates supported thereon.

Referring now particularly to FIGS. 1 and 2, the jig apparatus of this invention is shown generally at 10 and includes floor engaging feet 12 and 14 with columns 16 and 18 vertically affixed thereto, respectively. Lateral stability between columns 16 and 18 is provided by a cross piece 20 while cross braces 22 and 24 provide additional stability.

A countertop support surface is provided by two scaffolds, scaffold 26 and scaffold 28 which are mounted parallel to feet 12 and 14, respectively. Scaffold 26 includes a padding 42 on its vertical face and a padding 43 on its horizontal surface, both of which protect countertop 400 from marring and abrasion. Similar padding surfaces 44 and 45 are found on scaffold 28. Padding 42, 43, 44, and 45 may be fabricated from any suitable material such as a rubberized material, cork laminate or the like. Added stability to scaffold 26 is provided by a lateral brace 38 which is placed between the end of scaffold 26 and a support arm 34. A similar lateral brace 40 extends between support arm 36 and scaffold 28.

Support arm 34 has an anvil 30 mounted thereon while support arm 36 has mounted thereon an anvil 32. The top surfaces of anvils 30 and 32 reside in essentially the same plane as that between the support surfaces provided by padding 43 and 45 of scaffolds 26 and 28, respectively. Anvils 30 and 32 complete the support structure provided by scaffolds 26 and 28. Accordingly, a countertop that is supported by scaffold 26 and 28 is also supported by anvils 30 and 32, the anvils presenting a surface against which downwardly acting pistons 50 and 52, respectively, press.

Piston 50 is pneumatically operated and includes a platen 54 on the end thereof. Piston 50 and platen 54 are raised or lowered as indicated by arrow 58 by suitably controlling the direction of air pressure into cylinder 46. A similar platen 56 on piston 52 is also raised and lowered as indicated by arrow 60 by suitably controlling the direction of air pressure in cylinder 48.

Cylinder 46 is pivotally supported on column 16 by means of arms 62 and 66 between which a cross brace 70 is provided. Arms 62 and 66 pivot on column 16 by means of a shaft 74 which extends through a hole 86 in flange 78 and corresponding hole (not shown) in flange 82. Flanges 78 and 82 are affixed to column 16. Accordingly, cylinder 46 is firmly engaged vertically with respect to column 16 while simultaneously accommodating left and right pivotal movement as indicated by arrow 90.

Cylinder 48 is correspondingly supported by arms 64 and 68 and cross brace 72 on the shaft 76 which, in turn, is received in a bore 88 in flange 80 and a corresponding bore (not shown) in flange 84. Flanges 80 and 84 are affixed to column 18. Pivotal movement of cylinder 48 is thereby provided as indicated by arrow 92. Accordingly, both cylinders 46 and 48 with their respective cooperating parts can be rotatably swung left or right to permit placement of a countertop 400 on the scaffolds 26 and 28 and thereafter returned to the working position directly above anvils 30 and 32, respectively.

Countertop 400 preferentially includes a conventional backsplash 408 which readily passes underneath either of pistons 50 and 52 with their respective platens 54 and 56. However, many domestic countertops 400 include a backsplash 408 which is substantially higher, for example, as high as even 18 inches. Accordingly, arms 66 and 68 are each elevated above scaffolds 26 and 28 so as to readily accommodate a higher backsplash 408. Furthermore, each of cylinders 46 and 48 may be readily pivoted as indicated by arrows 90 and 92, respectively, so as to provide free access to the space normally occupied by the same.

Air pressure for the actuation of cylinders 46 and 48 is received through an air line 98 from a source of air pressure (not shown) and is directed through suitable conventional air filters indicated generally at 100. The air pressure is then directed to the control levers 94 and 96 through air lines 102 and 104, respectively.

Control level 94 is a conventional control lever with movement of the control lever directing the incoming air pressure to the appropriate control line. For example, upward movement of control lever 94 directs the air pressure into air line 110 thereby forcing the piston 50 to move upwardly in cylinder 46. Conversely, a downward movement of lever 94 directs the air pressure into air line 106 forcing the piston 50 downwardly so as to suitably engage a countertop 400 (FIG. 2) between platen 54 and anvil 30.

Control lever 96 also suitably directs the air pressure from supply line 104 into either of air lines 108 or 112 in a manner similar to that set forth with respect to lever 94 to control piston 52.

An auxiliary cylinder 114 is pivotally attached to column 18 by means of a support arm 130, a cross brace 132 and a pivot 136. Pivot 136 cooperates between flanges 134 and 138 to support the auxiliary cylinder 114 above anvil 120. Arrow 148 indicates the pivotal movement of auxiliary cylinder 114.

Auxiliary cylinder 114 with piston 116 and a platen 118 thereon cooperate with an anvil 120 through movement as indicated by arrow 150. A lever 140 controls air pressure from a supply line 142 to direct air pressure through a down line 144 or an up line 146 to thereby control the position of piston 116 and its platen 118.

Anvil 120 is pivotally attached to column 18 through arm 122. Pivotal action of arm 122 is attained by a sleeve 126 which telescopically slips over an upright boss (not shown) vertically extending from flange 124. A locking lever 128 is provided to prevent movement of arm 122 from its desired operative position underneath auxiliary cylinder 114. Locking lever 128 may be raised to permit support arm 122 and anvil 120 to be pivoted to either a left or right position.

While either of the anvils 30 or 32 could be used to prepare the male insert 354, auxiliary cylinder 114 and anvil 120 are primarily used to prepare a male insert 354 (FIGS. 10 and 12) using male template 300 (FIGS.

Figure 12:
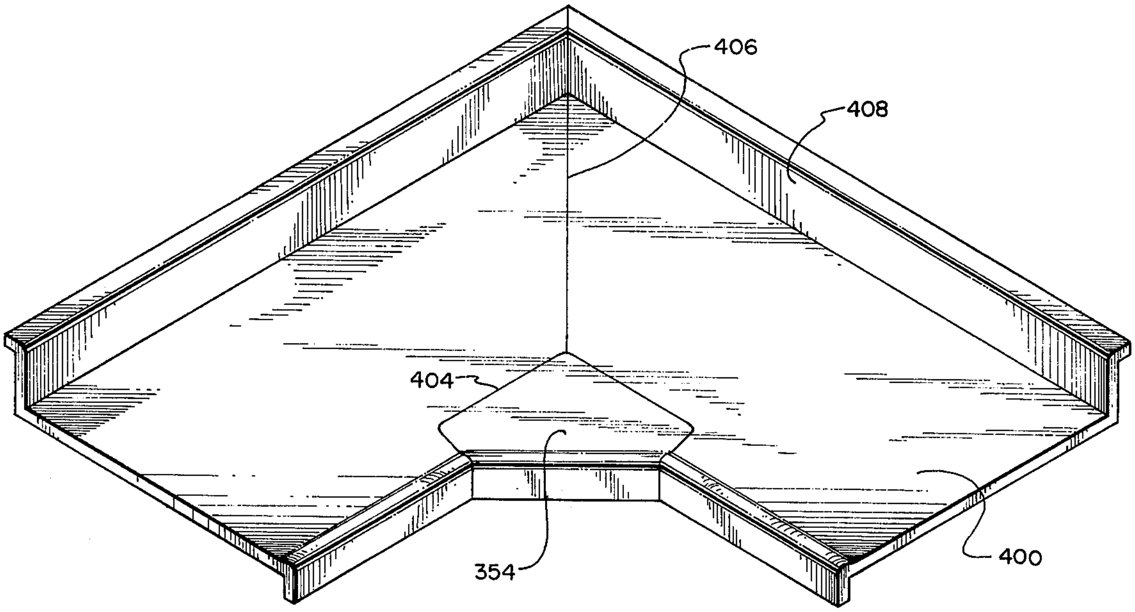
FIG. 12 is a perspective view of a countertop produced with the apparatus and method of this invention.

6–10). Preferentially, a triangular end portion 401 (FIG. 2) which is cut off from one end of the countertop surface to prepare the miter 406 may be used in combination with male template 300 so as to provide a male insert for the countertop. Auxiliary cylinder 114 is an advantageous feature of this invention since it eliminates the necessity for removing countertop 400 from scaffold 26 and 28 and anvils 54 and 56 in order to use either of cylinders 46 or 48 for the purpose of holding male template 300 on a suitable segment of countertop surface such as shown by workpiece 401 to prepare the male insert 354 (FIG. 12).

THE FEMALE TEMPLATE

Figure 3:
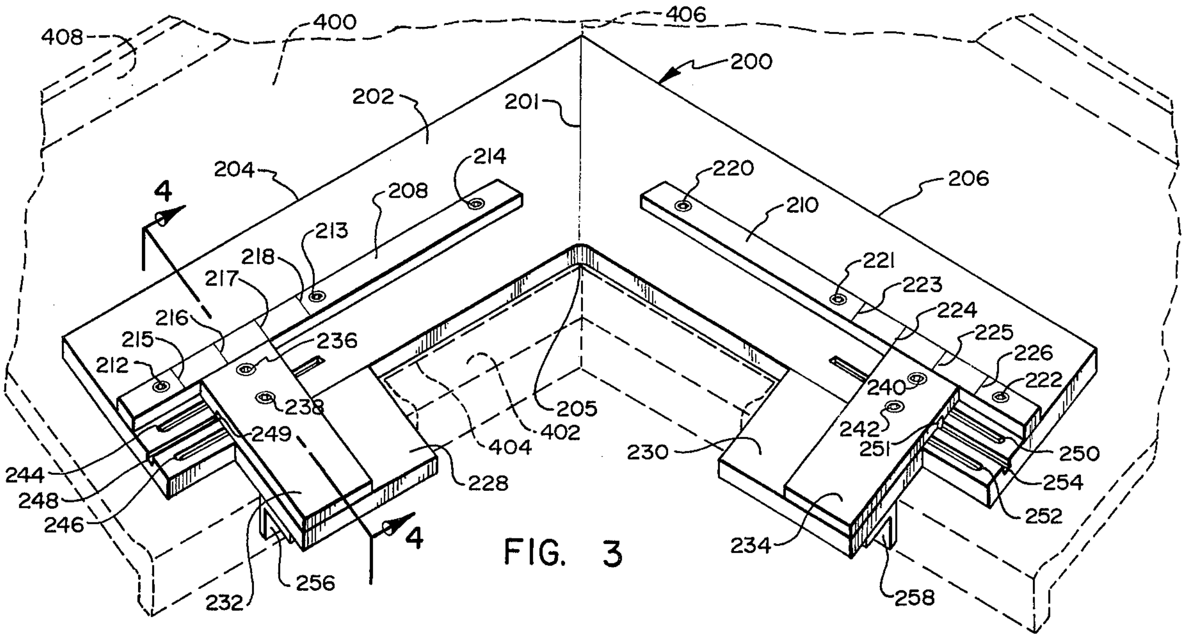
FIG. 3 is a perspective illustration of one preferred embodiment of the female template of this invention superimposed upon a broken line representation of a countertop corner.
Figure 4:
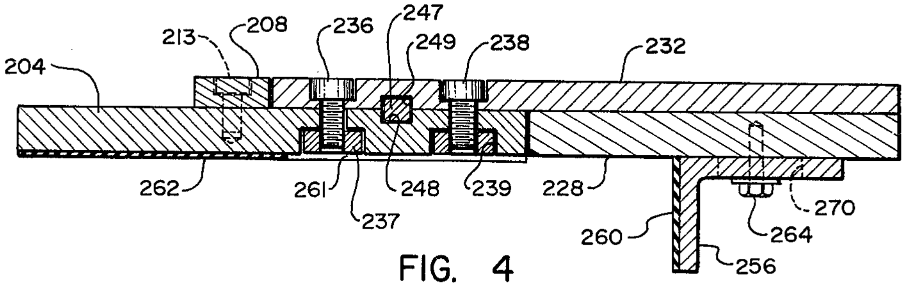
FIG. 4 is a cross section taken along lines 4—4 of FIG. 3.
Figure 5:
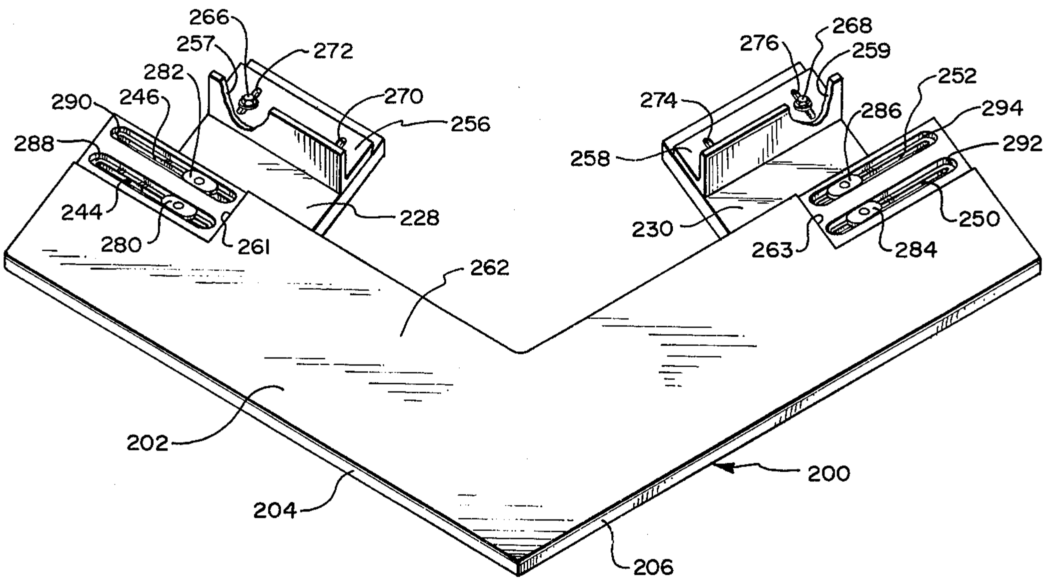
FIG. 5 is a perspective illustration of the underneath side of the female template of FIG. 3.
Figure 6:
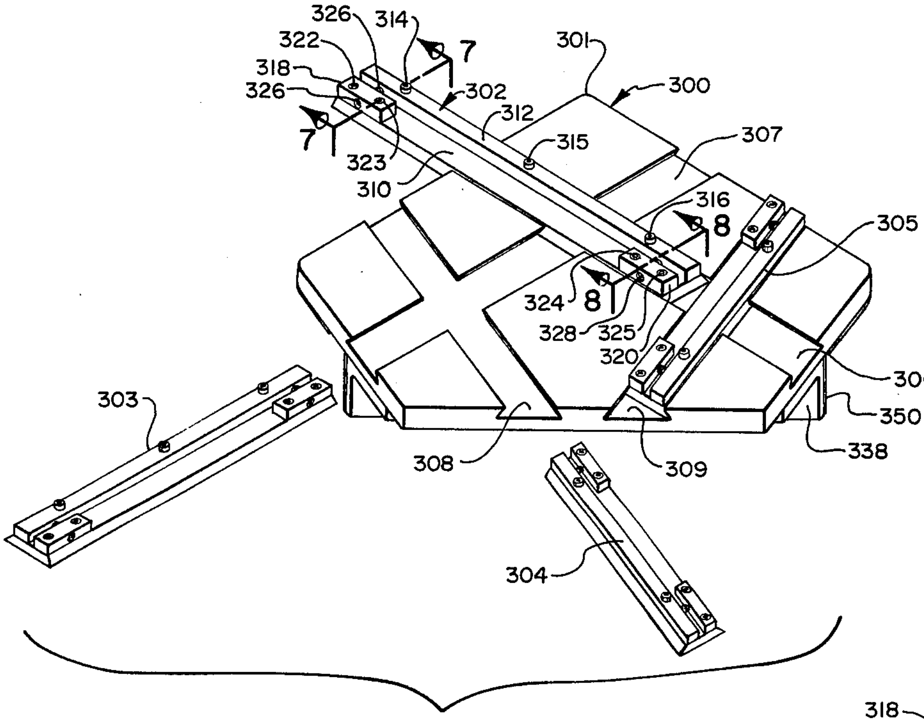
FIG. 6 is a partially exploded perspective illustration of one preferred embodiment of the male template of this invention.

Referring now to the female template apparatus illustrated in FIGS. 3–5, the female template is shown at 200 and includes a base plate 202 separated into a left arm 204 and a right arm 206. The intersection of left arm 204 with right arm 206 forms a right angle at 205. Right angle is preferentially provided since most domestic kitchen countertops having an angle formed therein are formed as a right angle. However, other angular configurations for the countertops can be accommodated by suitably altering the angle 205 to correspond thereto. It should be particularly noted at this point that angle 205 formed between our left arm 204 and right arm 206 is not a critical feature since other guiding devices are attached to the female template 200 for the purpose of guiding a cutting tool in cutting out the segment from the countertop as will be discussed more fully hereinafter.

Female template 200 includes a scribe line 201 at the intersection between arms 204 and 206 which is used to coordinate the female template 200 with the miter 406 of the countertop 400 so as to suitably center the female template 200 on the inside corner of the countertop 400.

Cutting tool guide bars are shown as a left guide bar 208 mounted on left arm 204 and a right cutting tool guide bar 210 mounted on right arm 206. Screws 212–214 are preferentially flush mounted and are used to secure guide bar 208 on arm 204 while similar screws 220–222 are used to mount guide bar 210 on arm 206.

A left-hand guide bar 232 is adjustably attached to left arm 204 while a right-arm guide bar 234 is similarly adjustably attached to right arm 206. Transverse guide bars 232 and 234 cooperate with guide bars 208 and 210, respectively, to suitably guide a router (shown in broken lines as 500, FIG. 2) or other suitable cutting tool around the periphery 404 of female segment (FIG. 11) as defined by the guide bars. It is, of course, clearly understood that the guide bars, per se, do not in and of themselves define the periphery of the cut-out portion since they only serve as stops against which a guide portion of the cutting tool is pressed, the cutting member of the tool being a discrete distance from the edge of the cutting tool.

A support plate 228 is attached to the underside of transverse guide bar 232 and acts as a support for cutting tool 500 (FIG. 2) which is placed thereupon and in abutment with transverse guide bar 232. A corresponding support plate 230 is mounted underneath transverse guide bar.

A plurality of guide lines 215–218 on guide bar 208 and 223–226 on guide bar 210, are scribed thereon and serve as markers against which the transverse guide bars 232 and 234, respectively, can be coordinated with the respective guide bars to produce a predetermined size cutout with the female template 200.

Referring now more particularly to FIG. 4, the cross section more clearly illustrates the relationship between guide bar 208 and transverse guide bar 232 with its accompanying support plate 228 mounted on the underside thereof. A stop 256 is attached to support plate 228 and is placed in abutment with the edge of countertop 400 (FIG. 3). A facing pad 260 prevents stop 256 from marring the edge of countertop 400 (FIG. 2). A corresponding stop 258 and facing pad (not shown) is also attached to the underside of support plate 230 (FIGS. 3 and 5). Stop 256 is adjustably mounted on the underside of support plate 228 by means of a bolt 264 with cooperates in an elongated slot 270 in stop 256.

Parallel keyways 248 and 254, respectively, provide lateral integrity to the transverse guide bars 232 and 234. Cooperating keyways 249 and 251 are found in each of transverse guide bars 232 and 234, respectively. The keyways 248 and 249 form a channel in which a key 247 is inserted and serves to improve the transverse integrity of the transverse guide bar 232 while it is being slideably adjusted along slots 244 and 246.

Referring now particularly to FIG. 5, female template 200 is reversed from the position shown in FIG. 3 to illustrate the underside thereof. In particular, the adjustment slots 270 and 272 for adjustment of stop 256 relative to support plate 228 are more clearly illustrated. Bolt 266 passes through slot 272 and bolt 264 (FIG. 4) passes through slot 270. Corresponding features with respect to bolt 268 and slots 274 and 276 are also found for obtaining adjustment of stop 258 with respect to support plate 230. A breakaway portion 257 in stop 256 and breakaway portion 259 in stop 258 reveal the one bolt and slot combination in each of the stops, respectively.

Transverse guide bar 232 is adjustably attached to left arm 204 by means of parallel slots 244 and 246 through which bolts 236 and 238 extend and are held with nuts 280 and 282, repsectively. Each of nuts 280 and 282 are slideably adjustable in countersunk slots 288 and 290, respectively, to hold transverse guide bar 232 on left arm 204. Thus, through adjustment of the position of guide bars 228 and 230 and also adjustment of the stops 256 and 258, the size of the cutout 404 (FIG. 12) created by the female template 200 can be preselected. The countersunk slots 288 and 290 permit the nuts 280 and 282 to be recessed to provide a flat surface on the underside of the female template 200. Similar features are found with respect to transverse guide bar 234 in that bolts 240 and 242 pass through slots 250 and 252 and are held therein by nuts 284 and 286, respectively. Nuts 284 and 286, respectively, are received in corresponding countersunk slots 292 and 294.

Figure 10:
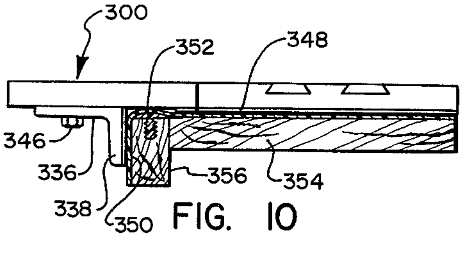
FIG. 10 is a side elevation of the male template placed upon a fragment of countertop surface.

The bottom surface of female template 200 is covered with a protective pad 262 which serves a double function of (1) protecting the decorative surface of the countertop 400 (FIGS. 2 and 3) and (2) elevating the female template 200 to compensate for the raised bull nose section of the countertop which is in abutment with pad 260 (compare with bull nose 352, FIG. 10). Conventionally, the elevation provided by a conventional bull nose on a countertop is $\frac{1}{8}$ inch and, correspondingly, the thickness of pad 262 is $\frac{1}{8}$ inch thereby providing female template 200 with a leveling feature to compensate for the upraised drip edge or bull nose of the countertop. Cutout portions 261 and 263 in the facing pad 262 permit access to the bolts 280, 282, 284 and 286, respectively.

THE MALE TEMPLATE

Referring now more particularly to FIGS. 6–10, a male template is shown at 300 and includes a plurality of guide bar inserts 302–305 which cooperate with a plurality of slots 306–309, respectively. Each of slots 306–309 is prepared so as to receive the respective guide bar insert 302–305 in a parallel relationship with an edge adjacent the respective slot. Each of slots 306–309 are set back from the adjacent edge in order to provide a support surface upon which a cutting tool 501 (FIG. 2) can rest while the cutting bit (not shown) is extended downwardly therefrom to cut along the edge of a male insert 345 (FIG. 10) as predetermined by the individual cutting tool guide bars.

Since each guide bar insert is substantially similar to the other guide bar inserts, only particular features with respect to guide bar insert 302 will be discussed in detail, it being particularly understood that identical features are also found on the remaining guide bar inserts.

With particular reference to guide bar insert 302, an insert plate 310 dimensionally corresponds to slot 306 so as to be securely retained thereby. Slot 306 is configurated with undercut sides and slideably receives corresponding chamfered edges 311 (FIG. 7) of insert plate 310. In this manner, insertion of guide bar insert 302 into the slot 306 provides a secure engagement between guide bar insert 302 and male template 300. Alternatively, slot 306 could be configurated with vertical side walls. However, vertical side walls would mean that additional care would be required to prevent guide bar insert 302 from falling out of male template 300 if it were carelessly handled or inverted.

Figure 7:
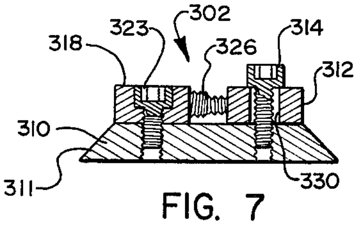
FIG. 7 is a cross section taken along lines 7—7 of FIG. 6.
Figure 8:
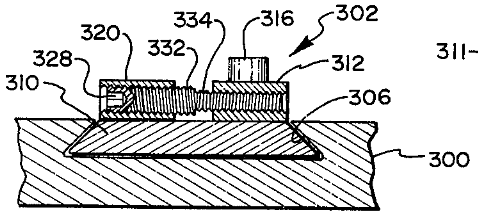
FIG. 8 is a cross section taken along lines 8—8 of FIG. 6.

Referring now more particularly to FIGS. 7 and 8, guide bar 312 is adjustably attached to insert plate 310 on the edge adjacent the corresponding edge of male template 300 by means of a plurality of bolts 314–316. Each of bolts 314–316 are inserted through enlarged holes in guide bar 312 so as to permit minute adjustments of guide bar 312 in its relationship to guide bar insert 310 and, correspondingly, the adjacent edge of male template 300. Bolts 314–316 are each received through an enlarged bore, for example bore 330 of FIG. 7, to accommodate adjustment of guide bar 312 with respect to bolt 314. Preferentially, cutting tool guide bar 312 is minutely adjustable with respect to guide bar insert 310 so as to (1) compensate for minor variations between slot 306 and the adjacent edge of male template 300; (2) compensate for changes in dimensions of the cutting bit (not shown) of the cutting tool 501 (Fig. 2) brought about by bit changes, bit wear and bit sharpening; and (3) closely adapt male template 300 to female template 200 (FIG. 3) so that the male insert 354 prepared with male template 300 will fit in a snug fit relationship in female cutout 404 (FIGS. 11 and 12) of countertop 400.

Adjustment of guide bar 312 is attained by use of adjustment blocks 318 and 320 each of which are securely mounted upon guide bar insert 302 by means of bolts 322 and 323 and bolts 324 and 325, respectively. Counterthreaded adjustment screws 326 and 328 extend transversely through each of support blocks 318 and 320, respectively. Each of the adjustment screws 326 and 328 is selectively diametrally reduced and counterthreaded so as to permit adjustment of guide bar 312 with respect to support blocks 318 and 320, respectively.

With particular reference to adjustment screw 328, an enlarged diameter threaded section 332 is received in a correspondingly threaded bore in support block 320. The distal end of adjustment screw 328 has been configurated with a smaller diameter threaded with threads 334 that are turned in the opposite direction, the smaller diameter 334 being threadedly engaged with guide bar 312. Accordingly, engagement of adjustment screw 328 with a suitable tool, for example a conventional Allen wrench, and rotation of adjustment screw 328 selectively moves guide bar 312 toward or away from support block 320. Similar features are also found with respect to adjustment screw 326 in its cooperation between support block 318 and guide bar 312. Accordingly, after the guide bar 312 has been suitably adjusted bolts 314–316 are tightened so as to secure the relationship between guide bar 312 and the remaining apparatus of guide bar insert 302 and, correspondingly, the adjacent edge of male template 300.

Figure 9:
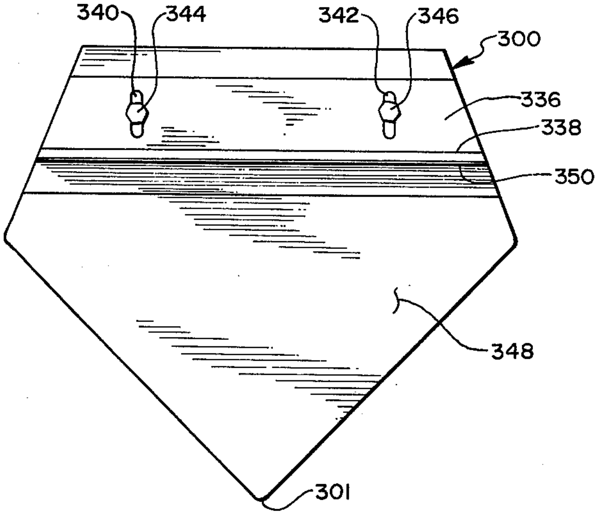
FIG. 9 is a plan view of the underneath side of the male template of FIG. 6.

Referring now more particularly to FIGS. 9 and 10, male template 300 includes a stop plate 336 which includes a downwardly depending stop flange 338. Stop plate 336 includes transverse slots 340 and 342 by which stop plate 336 is bolted to male template 300 by means of bolts 344 and 346, respectively. Adjustment of stop plate 336 with respect to male template 300 is accomplished by loosening each of bolts 334 and 346 and moveably adjusting the stop plate 336 within the limits of slots 340 and 342 and thereafter tightening each of bolts 334 and 346.

The underneath surface of male template 300 is covered with a protective backing or pad 348 which is of a thickness to compensate for the rise created by the drip edge insert 352 (FIG. 10). In particular, it should be noted that pad 348 remains an incremental distance away from stop flange 338 so as to accommodate the rise created by the drip edge insert 352. The facing edge of stop flange 338 is also faced with a protective pad 350 so as to prevent marring or otherwise disfiguring of the facing edge of a countertop 401 (FIG. 2) upon which the male template is secured.

Figure 11:
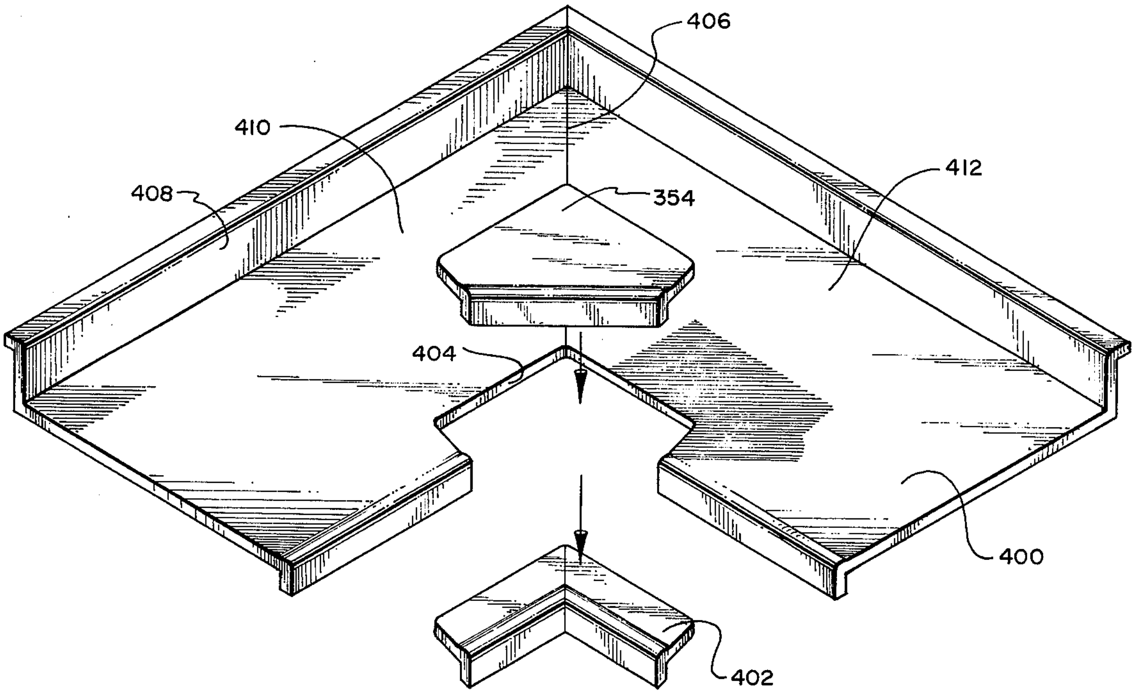
FIG. 11 is an exploded perspective view of a countertop showing the relationship between the male insert and the portion removed by the female template.

Referring now more particularly to FIGS. 11 and 12, countertop 400 is shown as a corner countertop fabricated from two countertop segments 410 and 412 which have been joined along a miter 406. Female segment 402 is removed from the inside corner of countertop 400 and the periphery 404 of the void created by the removal of female segment 402 is suitably shaped and prepared by use of female template 200 (FIGS. 2 and 2–5) in combination with cutting tool 500 (FIG. 2) according to conventional techniques. The periphery 404 resulting from removal of female segment 402 is specifically coordinated to dimensionally correspond with a male insert 354.

THE METHOD

The method of this invention involves cutting two countertop sections 410 and 412 along corresponding miters and thereafter temporarily joining them together along miter 406. One of the countertop segments removed from either countertop sections 410 or 412 shown herein as countertop segment 401 (FIG. 2), is preferentially used as the source material for male insert 354. Male insert 354 is customarily prepared first and is then used to adjust female template 200 so as to prepare a corresponding periphery 404 upon removal of female segment 402.

Male insert 354 is obtained from countertop segment 401 (FIG. 2) by a rough cut approximating the pentagonal configuration of male template 300 as defined by the portion of male template 300 between the apex 301 and both ends of stop plate 336. Thereafter, male template 300 is securely clamped to the countertop insert 354 and a conventional routing tool 501 (FIG. 2) with a cutting bit having sufficient length to accommodate the height of facing edge 356 is obtained for the purpose of shaping the peripheral edge of countertop insert 354.

Male template 300 and countertop segment 401 are clamped between anvil 120 and platen 118 and guide bar inserts 302–305 are sequentially inserted in slots 306–309 so as to sequentially guide cutting tool 501 (FIG. 2) around the periphery of male template 300 to obtain a precisely shaped periphery for male countertop insert 354.

Preferentially, to prevent damage to the edges of male countertop insert 354 during the shaping operation, router 501 (FIG. 2) having a clockwise rotating bit is used along guide bar inserts 305 and 302 while a rounter 501 (FIG. 2) having counterclockwise rotating bit is used along guide bar inserts 304 and 303, both cutting tools terminating their operation at apex 301.

After male countertop insert 354 has been suitably shaped along its peripheral edge in the form of a pentagonal male insert, it is now ready for insertion into the female template 200 as an adjustment guide for the same. Bolts 236, 238, 240, and 242 are loosened and transverse guide bar supports 228 and 230 (FIG. 3), respectively, are brought into abutment with male insert 354. Thereafter, bolts 236, 238, 240 and 242 are tightened to secure their location with respect to male insert 354. If necessary, stops 256 and 258 may also be adjusted to correspond the outside corners of male insert 354 with the outside corners of periphery 404.

Female segment 402 is then outlined and a rough cut made along periphery 404 to remove female segment 402. Thereafter, female template 200 is securely clamped to countertop 400 (FIG. 2) and final shaping of periphery 404 is done with a cutting tool 500 (FIG. 2) according to conventional techniques. Cutting bit rotation is coordinated as set forth hereinbefore to minimize damage to facing edges of countertop 400. Periphery 404 and, correspondingly, countertop 400, is now ready to receive male insert 354.

Countertop segments 410 and 412 are initially temporarily joined by conventional techniques including bolts (not shown) which cooperate across miter 406 to bring together segments 410 and 412. The bolts are loosened in order to permit the insertion of male countertop insert 354 into the opening obtained when segment 402 is removed from countertop 400. Thereafter, the abutting edges along miter 406 and the peripheral edges 404 and that of male countertop insert 354 are treated with glue, coordinated, and the bolts tightened to create an integral countertop unit (FIG. 12).

By suitably coordinating the male template 300 with the female template 200, the peripheral edge of male countertop insert 354 closely corresponds with the peripheral cutout 404 from which the female segment 402 has been removed. In this manner, a very close fit with practically invisible joinder lines along the peripheral edges thereof is obtained when the bolts (not shown) are suitably tightened so as to form a completed countertop 400.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embodied within their scope.

I claim:

1. Apparatus for preparing an insert to the inside corner of a workpiece fabricated from two elements joined at a miter, comprising:

a female template for guiding a cutting tool in cutting a female segment from the inside corner of the workpiece;

a male template for guiding a cutting tool in cutting a male insert dimensionally corresponding to at least a portion of the periphery of the void created by removal of the female segment; and a jig comprising a framework including a scaffold and means for holding the workpiece, female template, and male template securely on the scaffold.

2. An apparatus as defined in claim 1 wherein the female template comprises a planar body having two arms forming an angle, each arm having a first cutting tool guide bar generally parallel to the edge of the arm and a second cutting tool guide bar adjustably supported on the arm and extending transversely from the arm, and means for providing adjustment of each said second guide bar.

3. An apparatus as defined in claim 2 wherein the female template further comprises a workpiece engagement stop adjustably mounted on each transversely extending guide bar.

4. An apparatus as defined in claim 1 wherein the male template comprises a planar element having at least three guide edges, each guide edge having a cutting tool guide bar removably mountable adjacent thereto, each cutting tool guide bar being adjustable with respect to its respective adjacent guide edge.

5. An apparatus as defined in claim 4 wherein the male template further comprises a workpiece engagement stop adjustably mounted on the side reverse from the cutting tool guide bars.

6. An apparatus as defined in claim 1 wherein the jig framework comprises two columns vertically supported by floor-engaging feet, each column having a downwardly actuated piston supported on an arm swingably mounted to the column.

7. An apparatus as defined in claim 6 wherein the jig framework further comprises a two-sided scaffold mounted on each vertical column, a support arm mounted on each vertical column, and an anvil mounted on each support arm coplanar with one of the sides of each two-sided scaffold and positioned to cooperate with one of the pistons.

8. An apparatus as defined in claim 7 wherein the jig further comprises a third anvil affixed to one of the columns and adapted to cooperate with a piston attached to an arm swingably mounted to the column.

9. An apparatus as defined in claim 6 wherein the pistons are actuated pneumatically both downwardly and upwardly.

10. A female template for removing a segment from an inside corner of a workpiece fabricated from two members joined at an angle, the female template comprising:

a base plate having a first arm and a second arm joined to form a cutting angle;

a first cutting tool support plate mounted on the first arm so as to extend into the included angle defined between the first and second arms;

a second cutting tool support plate mounted on the second arm so as to extend into the included angle defined between the second arm and the first arm, the first and second support plates cooperating with the arms of the base plate to define sides of an open polygon; and guide means mounted upon the base plate and support plates at a spaced distance from the inside cutting angle for guiding a cutting tool over a precision path in cutting the segment from the workpiece.

11. A female template as defined in claim 10 wherein said cutting tool support plates are adjustable to change the size of the segment removed from the workpiece.

12. A female template as defined in claim 10 wherein said guide means is adjustable to compensate for variations in cutting tools.

13. A female template as defined in claim 10 wherein a first stop block is adjustably mounted underneath the first cutting tool support plate and a second stop block is adjustably mounted underneath the second cutting tool support plate, the blocks serving as stops for the female template when placed in juxtaposition against a workpiece.

14. A male template for preparing an insert for placement in an inside corner of a workpiece fabricated from two members joined at an angle, the male template comprising:

a cutting tool guide bar; and a male base plate comprising at least one insert slot adjacent and parallel one edge of the base plate, a guide bar insert configured to be telescopically received in the slot, the cutting tool guide bar being adjustably mounted to the guide bar insert.

15. A male template as defined in claim 14 wherein the male template further comprises a block adjustably mounted underneath the base plate and adjacent one edge of the base plate.

16. An apparatus for preparing a female segment for removal from an inside corner of a workpiece fabricated from two members joined at an angle and for preparing a male insert for replacing the female segment, said male insert having a corresponding periphery so as to provide an enlarged surface for the workpiece by transecting a portion of the inside angle of the workpiece with a portion of the male segment, the apparatus comprising:

(a) a female template for preparing the workpiece to receive a male insert, the female template comprising:

a base plate having a first arm and a second arm joined at an angle;

an array of cutting tool guide bars mounted on the female template to accommodate precision cutting of the workpiece; and (b) a male template comprising:

a polygonal base plate having at least one inside angle which dimensionally corresponds to the angle formed by the first and second arms of the female template; and an array of cutting tool guide bars mounted upon the base plate for regulating movement of a cutting tool along the periphery of the base plate; and (c) jig means for:

(1) temporarily securing the female template to the workpiece in the vicinity of the inside angle thereof, and (2) temporarily securing the male template to a workpiece segment; and means for releasing the male and female template from the respective workpieces after each has been cut in accordance with the path defined by the guide bars on the corresponding base plates.

17. A jig for releasably securing the corner portion of a laminated countertop, the jig comprising:

at least two generally vertical columns spaced one from the other;

a scaffold mounted upon each column intermediate the length thereof, each scaffold comprising a countertop-receiving support and a projecting anvil spaced from the support, the scaffold on the one column being oriented with respect to the scaffold on the other column so as to receive the weight of the corner portion of the countertop thereupon; and a support bracket rigidly secured to each column near the upper end thereof, each support bracket rotatably carrying a downwardly acting piston, each piston being selectively rotated into alignment with corresponding anvils and into a folded position permitting free access to the scaffold and means for reciprocating the piston downwardly to secure a workpiece tightly against the anvils and upwardly to release the workpiece from the scaffold.

18. A method for fabricating a corner insert for a countertop formed by intersection of two countertop segments joined together at a miter, the method comprising the steps of:

temporarily securing a female template on the inside corner of the joined countertop segments;

guiding a cutting tool along the periphery of the female template as said tool cuts a segment from the inside corner of said joined countertop segments, thereby creating a void at the inside corner of the joined countertop segments;

temporarily securing a male template to a second workpiece;

guiding the cutting tool along the periphery of the male template as said tool cuts a segment from the second workpiece, thereby obtaining a male insert for the void created at the inside corner of the joined countertop segments;

placing the male insert in the void; and securing the male insert into position.

19. A method of preparing a countertop workpiece having a male insert therein comprising the steps of:

selecting a template generally corresponding in size and shape with the male insert;

mounting guide bars on the template and adjusting the guide bars to a predetermined cutting tool so that the tool, when guided by the guide bars will make a precision cut of predetermined size corresponding to the insert;

providing a stop on the underside of the template, and selecting the location of the stop to define the depth of the precision cut into the workpiece when the stop is urged against the edge of the countertop workpiece; and cutting the countertop workpiece and guiding the movement of the cutting tool around a portion of the periphery of the template by urging the cutting tool against the guide bars.

20. A method of preparing a countertop workpiece as defined in claim 19 wherein said template comprises a female template having angularly related arms defining an acute angle therebetween and wherein said method further comprises the steps of:

mounting transverse guide bars upon each arm of the template so as to project into the included acute angle between the arms; and adjusting the position of the guide bars along each arm to correspond to the predetermined dimensional configuration of the male insert.

21. A method of preparing a countertop workpiece as defined in claim 20 wherein said adjusting step comprises inserting a male template into the female template and positioning the guide bars of the female template to correspond to the dimensions of the male template.

22. A method of preparing a countertop as defined in claim 19 wherein said male template has a polygonal shape and wherein said selecting step comprises:

slidably mounting the transverse guide bars parallel to at least two of the sides of the polygon, the path of the slidably mounted transverse guide bars intersecting one another; and alternately sliding the guide bars across the intersecting path to permit the cutting tool to follow each guide bar to the end of the polygonal side of the male insert.

23. A method of preparing a countertop as defined in claim 22 further comprising laterally adjusting the position of each guide bar with respect to its slidable mounting to compensate for tool bit wear.

* * * * *